UNITED STATES PATENT OFFICE.

PIERRE LUCIEN BRAULT, OF ST. JOHNS, QUEBEC, CANADA.

REMEDY FOR DYSPEPSIA.

SPECIFICATION forming part of Letters Patent No. 432,366, dated July 15, 1890.

Application filed April 15, 1890. Serial No. 347,937. (No specimens.) Patented in Canada February 8, 1890, No. 33,639.

*To all whom it may concern:*

Be it known that I, PIERRE LUCIEN BRAULT, a citizen of the United States, residing at St. Johns, in the county of St. Johns, Province of Quebec, Canada, have invented a new and useful Medical Compound, of which the following is a specification.

My invention relates to a medical preparation which is designed to be used in dyspepsia for the facilitation and assistance of digestion, and also as a general tonic for the stomach and liver, and for which Canadian Letters Patent No. 33,639 were issued to me on February 8, 1890.

The ingredients composing this compound are water, bicarbonate of soda, extract of taraxacum, and tincture of gentian mixed together in the following proportions: water, eight ounces; bicarbonate of soda, eighty grains; extract of taraxacum, one hundred and sixty grains; tincture of gentian, three hundred and twenty grains.

The above-mentioned ingredients are mixed intimately together in the proportions specified.

In using the above composition I employ said ingredients with a knowledge of the special properties of each. The bicarbonate of soda, as is well known, is a facilitant to digestion and a restorative for the action of the stomach, especially in persons troubled with the formation of too much acid, which often happens to individuals of sedentary habits. Taraxacum is well known as a remedy for complaints of the liver, and gentian, which is a bitter tonic, is recognized as a remedy that will excite the appetite, aid digestion, and as a general strengthening agent for the whole system. In view of the above-named properties of the said remedies a combination of them in certain proportions, as described for my compound, is therefore deemed particularly efficacious in diseases and troubles of the nature described, for which I claim in my invention.

This preparation is to be taken in doses of one table-spoonful three times a day half an hour before meals.

I am aware that taraxacum and gentian and bicarbonate of soda have been used in compounds for troubles of the stomach and liver; but I am not aware that they have been used in the combination and proportions described.

Having thus described my invention, its mixture, and proportions, what I claim as new, and desire to secure by Letters Patent, is—

The herein-described composition of matter to be used for the facilitation and assistance of digestion and in troubles of a dyspeptic nature, consisting of water, bicarbonate of soda, extract of taraxacum, and tincture of gentian, compounded in substantially the proportions specified.

In testimony that I claim the foregoing as my own I have hereto affixed my signature in presence of two witnesses.

PIERRE LUCIEN BRAULT.

Witnesses:
CORNELIUS JAMES MCCULLY,
A. A. BARRÉ.